United States Patent
Lee

(10) Patent No.: US 6,699,110 B2
(45) Date of Patent: Mar. 2, 2004

(54) APPARATUS FOR REPAIRING THE SURFACE OF AN OPTICAL DISC

(76) Inventor: Jean Chin Chu Lee, Room 6, 11th Floor, No. 410, Sec. 5, Jongshiow East Road, Taipei (TW)

( * ) Notice: Subject to any disclaimer, the term of this patent is extended or adjusted under 35 U.S.C. 154(b) by 0 days.

(21) Appl. No.: 10/032,002

(22) Filed: Dec. 31, 2001

(65) Prior Publication Data

US 2003/0124962 A1 Jul. 3, 2003

(51) Int. Cl.[7] .............................................. G11B 3/58
(52) U.S. Cl. .................. 451/242; 15/97.1; 15/DIG. 14; 369/72
(58) Field of Search ............................ 451/242, 56, 41; 369/72–74, 71; 15/97.1, 102, 265.5, DIG. 13, DIG. 14

(56) References Cited

U.S. PATENT DOCUMENTS

| | | | | |
|---|---|---|---|---|
| 2,322,470 A | * | 6/1943 | Rojas ........................... | 369/72 |
| 4,783,870 A | * | 11/1988 | Yeung .......................... | 15/97.1 |
| 5,146,382 A | * | 9/1992 | Yao-Ko ....................... | 360/137 |
| 5,423,103 A | | 6/1995 | Born | |
| 5,467,332 A | * | 11/1995 | Tsurushima .................. | 369/72 |
| 5,584,089 A | * | 12/1996 | Huang ......................... | 15/97.1 |
| 5,963,526 A | * | 10/1999 | Lee .............................. | 369/72 |
| 5,964,650 A | | 10/1999 | Born | |
| 6,059,888 A | * | 5/2000 | Hillman ........................ | 134/6 |

* cited by examiner

Primary Examiner—Joseph J. Hail, III
Assistant Examiner—Anthony Ojini
(74) Attorney, Agent, or Firm—Rosenberg, Klein & Lee

(57) ABSTRACT

An apparatus for repairing the surface of the optical disc, which is used to repair a damaged area of the laser transparent surface of the optical disc. A rotary seat is rotatably disposed on the base seat. An upper cover is pivotally connected with the base seat for covering the same. A buffing roller has a buffing layer and is rotatably disposed on inner side of the upper cover and passes over the disc rest face. A driving mechanism is mounted between the rotary seat and the buffing roller. When rotating, the buffing roller buffs the laser transparent layer of the disc. At the same time, the rotary seat is driven to rotate, whereby the disc rested on the disc rest face thereof is simultaneously rotated.

3 Claims, 6 Drawing Sheets

APPARATUS FOR REPAIRING THE SURFACE OF AN OPTICAL DISC

BACKGROUND OF THE INVENTION

1. Field of the Invention

The present invention is related to an apparatus for repairing the surface of an optical disc.

2. Description of the Prior Art

Optical discs include compact disc (CD), video compact disc (VCD), compact disc read only memory (CD-ROM), compact disc re-write (CD-RW) and digital video compact disc (DVD). The data stored in the disc are protected by a transparent layer on the surfaces of the disc. Hand cleaning or wiping of the discs often result in scratches. Also, when using or storing the disc, the transparent layer of the disc is subject to scratching. When passing through the scratch of the transparent layer, the laser beam will be abnormally refracted and it is impossible to truly read the signal.

For solving such problem, U.S. Pat. No. 5,423,103 "laser disc buffing apparatus" and U.S. Pat. No. 5,964,650 "method and apparatus for repairing optical discs" provide buffing wheel for removing the scratches on the surface of the discs. The buffing wheel creates a substantially flat force profile across the readable surface of the disc to facilitate the buffing or polishing of the disc as the wheel is rotatably driven to continually present a flattened profile to the disc. To buff a disc, the disc and the buffing wheel are simultaneously rotated. The disc preferably is rotated at a slower speed than the buffing wheel. The buffing wheel exerts a buffing force normal to the readable surface of the disc. The buffing action on the disc removes material from the readable surface and repair the surface. However, the above buffing wheels have some shortcomings as follows:

1. The buffing force exerted by the buffing wheel onto the readable surface of the disc is greatly varied with different areas of the buffing wheel. The area of the buffing wheel with greater deformation will exert greater force onto the readable surface of the disc. The area of the buffing wheel with less deformation will exert less force onto the readable surface of the disc. Therefore, the buffing pressure is uneven and the buffing effect is poor. Moreover, excessive buffing pressure will lead to damage of the readable surface of the disc.
2. The buffing apparatus has too large volume. The buffing wheel must spread out over the entire readable surface of the disc between the central area and the outer boundary. Therefore, the diameter of the buffing wheel must be larger than the width of the annular readable surface of the disc. Moreover, the buffing wheel must be normal to the readable surface so that the buffing apparatus as a whole will occupy too much room and can be hardly easily carried or stored.

SUMMARY OF THE INVENTION

It is therefore a primary object of the present invention to provide an apparatus for repairing the surface of a optical disc. The apparatus is able to exert more uniform buffing force onto the readable surface of the optical disc to achieve evener buffing effect without damaging the readable surface.

It is a further object of the present invention to provide the above repairing apparatus which has smaller volume and can be easily carried or stored.

According to the above objects, the repairing apparatus of the present invention includes a base seat, a rotary seat, an upper cover, a buffing roller and a driving mechanism. The base seat has a first central line. The rotary seat has a disc rest face for a optical disc to rest thereon. The rotary seat is rotatably disposed on the base seat with the first central line of the base seat normal to the disc rest face of the rotary seat. The rotary seat is supported by the base seat to rotate about the first central line thereof. One side of the upper cover is pivotally connected with the rim of the base seat as a first pivot side, whereby the upper cover can be closed and mated with the base seat to cover the same. The buffing roller has a second central line and a buffing layer around the surface of the buffing roller. The buffing layer is centered at the second central line. The buffing roller is rotatably disposed on inner side of the upper cover with the second central line passing over the disc rest face of the rotary seat. When the upper cover is closed to cover the base seat, the buffing layer of the buffing roller contacts with and passes over the annular laser transparent layer of the disc. The driving mechanism is mounted between the rotary seat and the buffing roller for simultaneously rotating the rotary seat and the buffing roller. When rotating, the buffing roller buffs the surface of the laser transparent layer of the disc and at the same time, the rotary seat is driven to rotate, making the disc rested on the disc rest face of the rotary seat rotate about the first central line of the base seat.

In the above repairing apparatus, the driving mechanism includes: a first gear formed around the rim of the rotary seat; a second gear rotatably disposed on the base seat and engaged with the first gear; a third gear fixedly coupled with the second gear and synchronously rotatable along with the second gear; and a fourth gear fixedly coupled with the buffing roller and separably engaged with the third gear.

The above repairing apparatus further includes an operation mechanism for driving the rotary seat and the buffing roller to simultaneously rotate.

In the above repairing apparatus, the operation mechanism includes a crank and is directly fixedly connected with the buffing roller.

The above repairing apparatus further includes a supporting rack having a board pattern. One side of the supporting rack is pivotally connected with the bottom face of the base seat as a second pivot side. The supporting rack is pivotally rotatable relative to the base seat to a folding position where the supporting rack attaches to the bottom face of the base seat. The supporting rack is also pivotally rotatable relative to the base seat to a supporting position where the supporting rack supports the base seat and an angle is contained between the supporting rack and the bottom face of the base seat. A stop section is formed on the bottom face of the base seat and adjacent to the second pivot side. When the supporting rack is pivotally rotated to the supporting position, the supporting rack is stopped by the stop section and one side of the base seat is lifted to facilitate cranking of the crank.

The above repairing apparatus further includes a locking latch including a latch plate and a latch hook. The latch plate is disposed on one side of the upper cover opposite to the first pivot side. The latch hook is disposed on the base seat at a position corresponding to the latch plate, whereby the latch plate can be latched with the latch hook to lock the upper cover with the base seat.

The present invention can be best understood through the following description and accompanying drawings wherein:

DETAILED DESCRIPTION OF THE PREFERRED EMBODIMENTS

Figure 1:
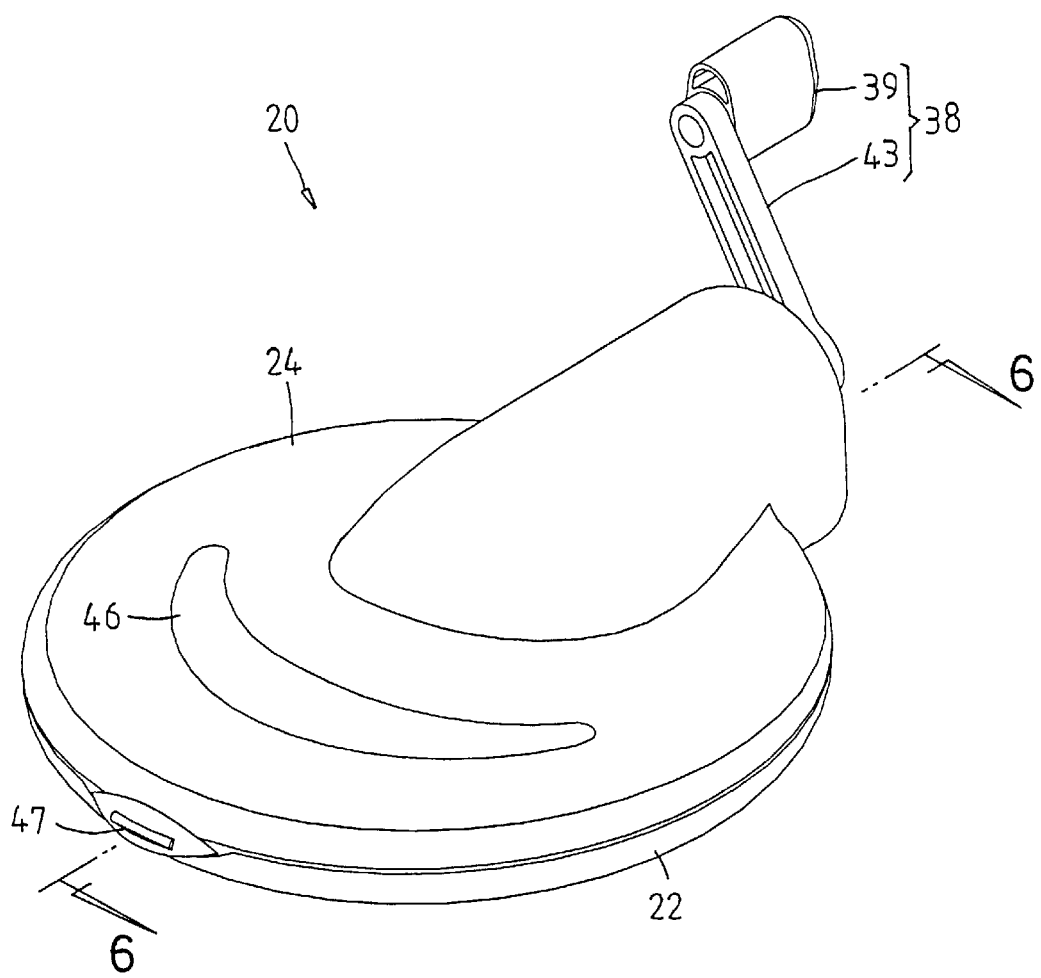
FIG. 1 is a perspective view of the present invention, in which the upper cover is closed to cover the base seat.
Figure 2:
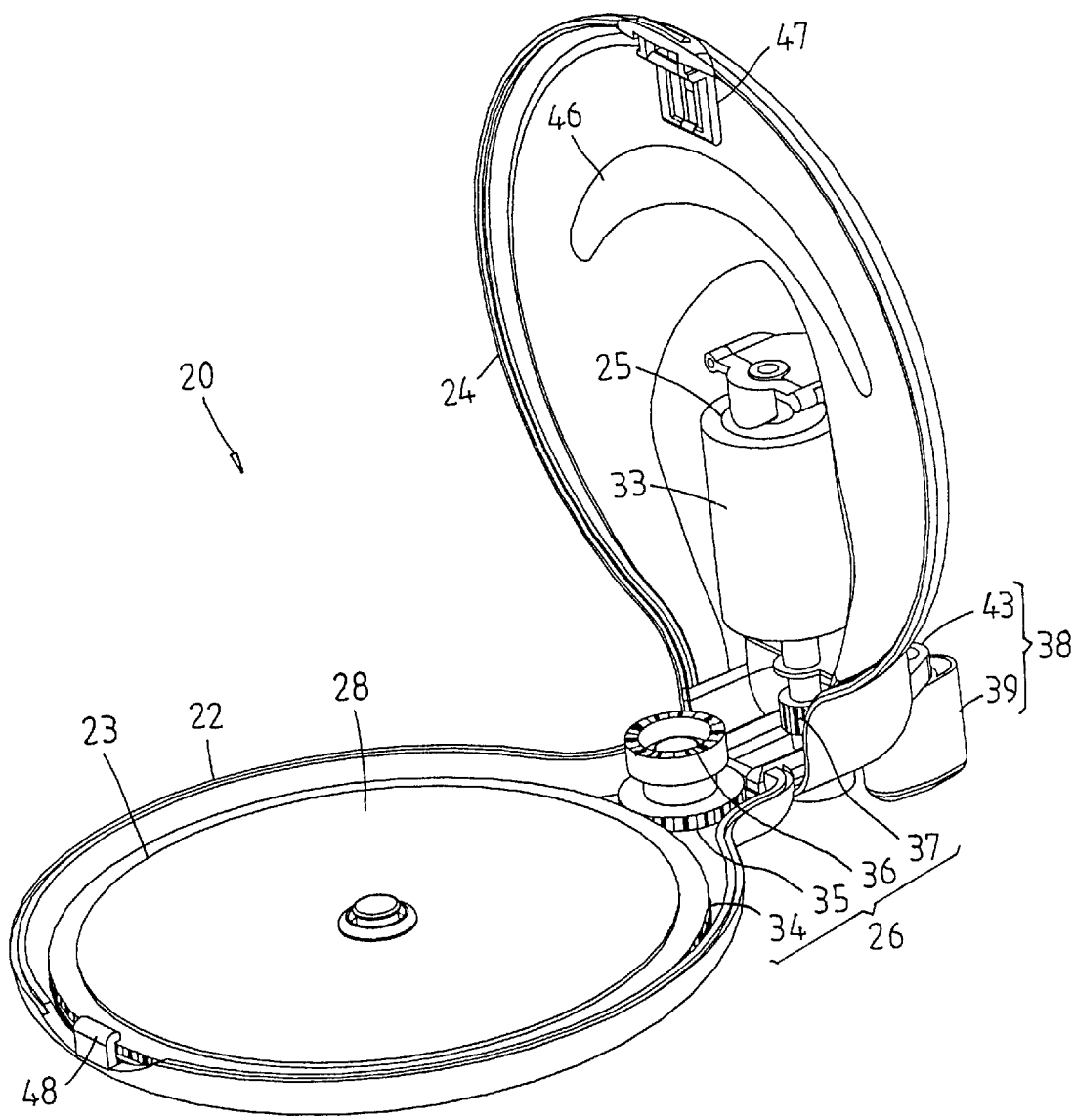
FIG. 2 is a perspective view showing that the upper cover is opened.
Figure 3:
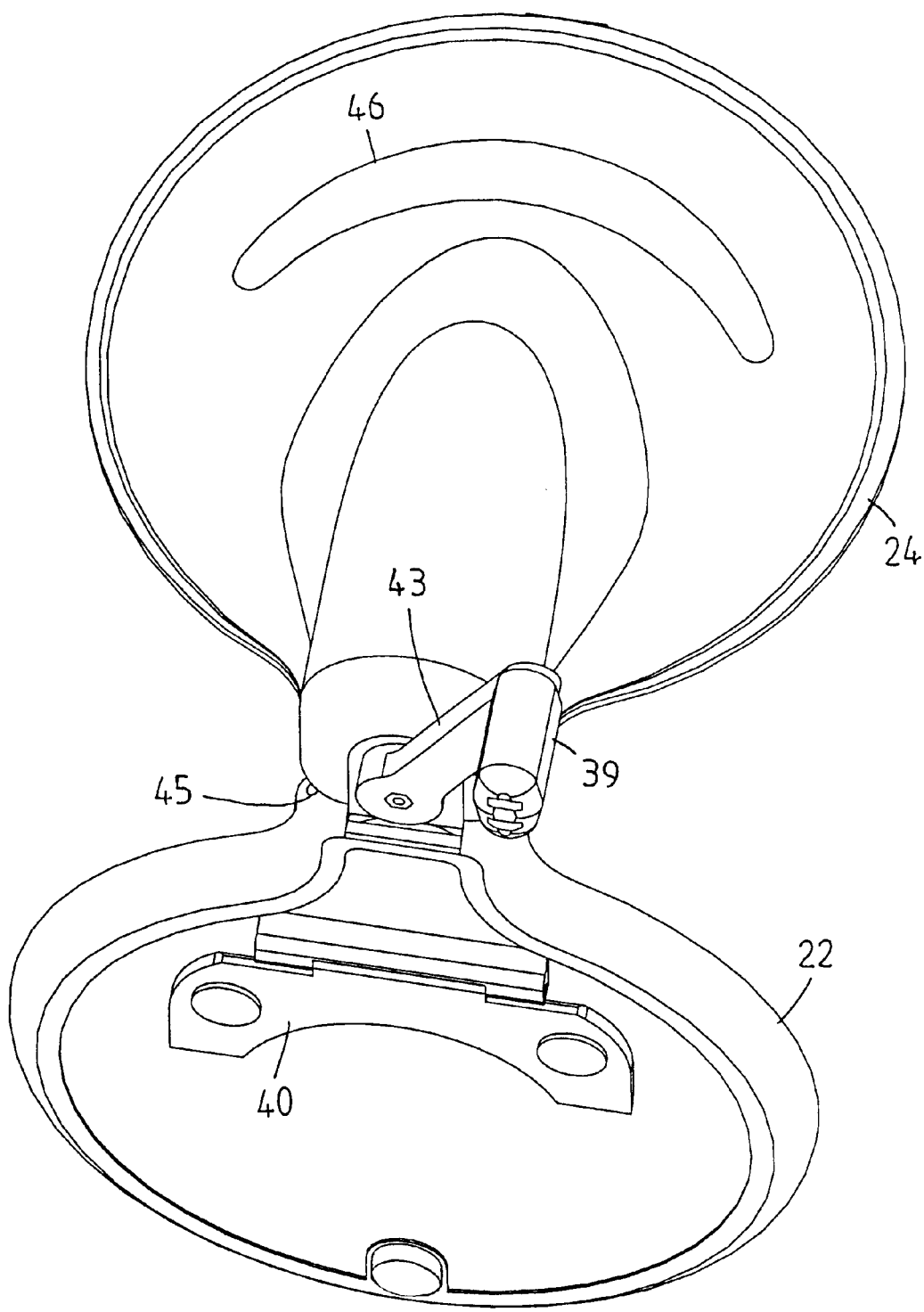
FIG. 3 is a perspective view of the present invention seen from back face and bottom face of the present invention, in which the upper cover is opened.
Figure 4:
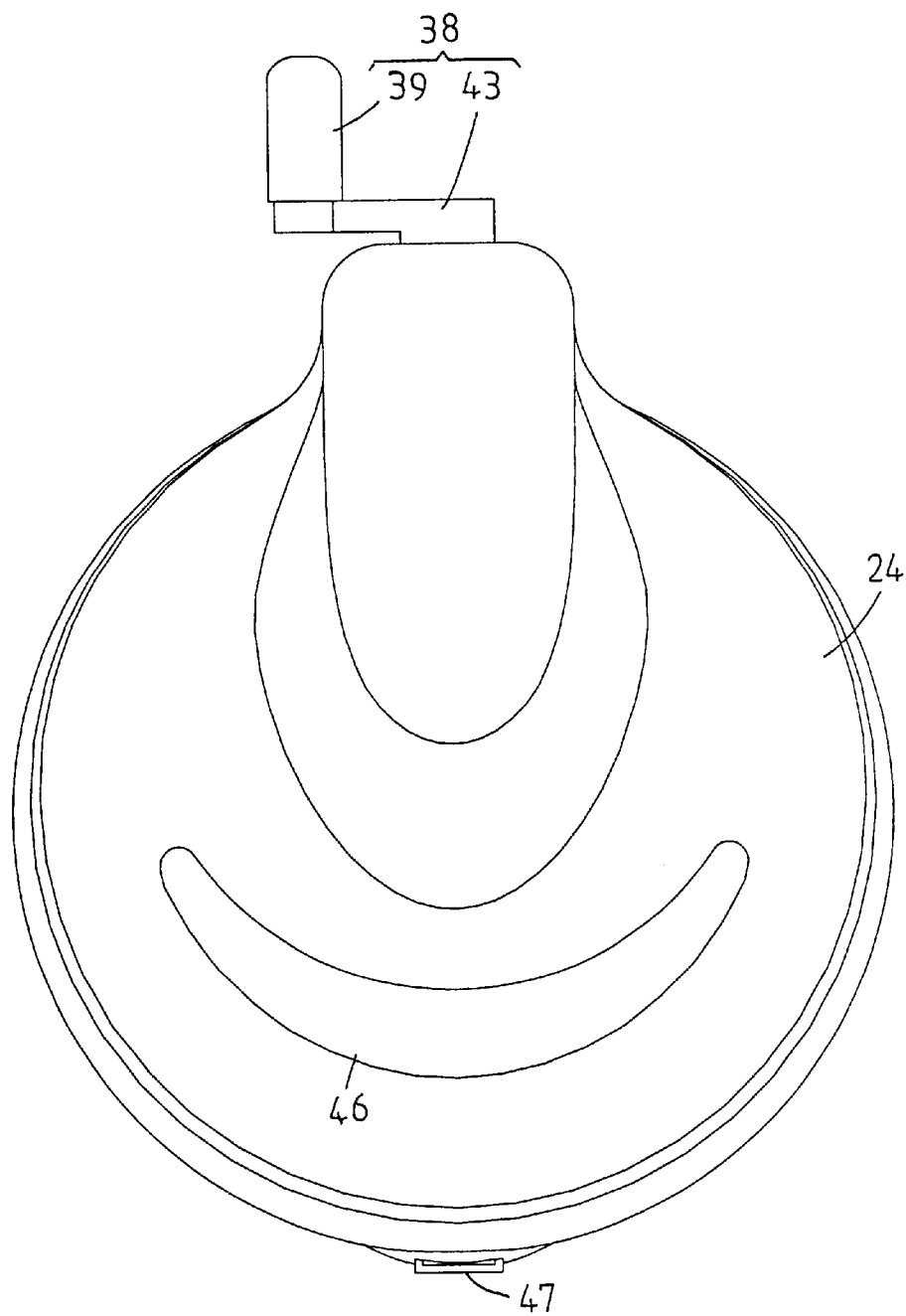
FIG. 4 is a top view of the present invention.
Figure 5:
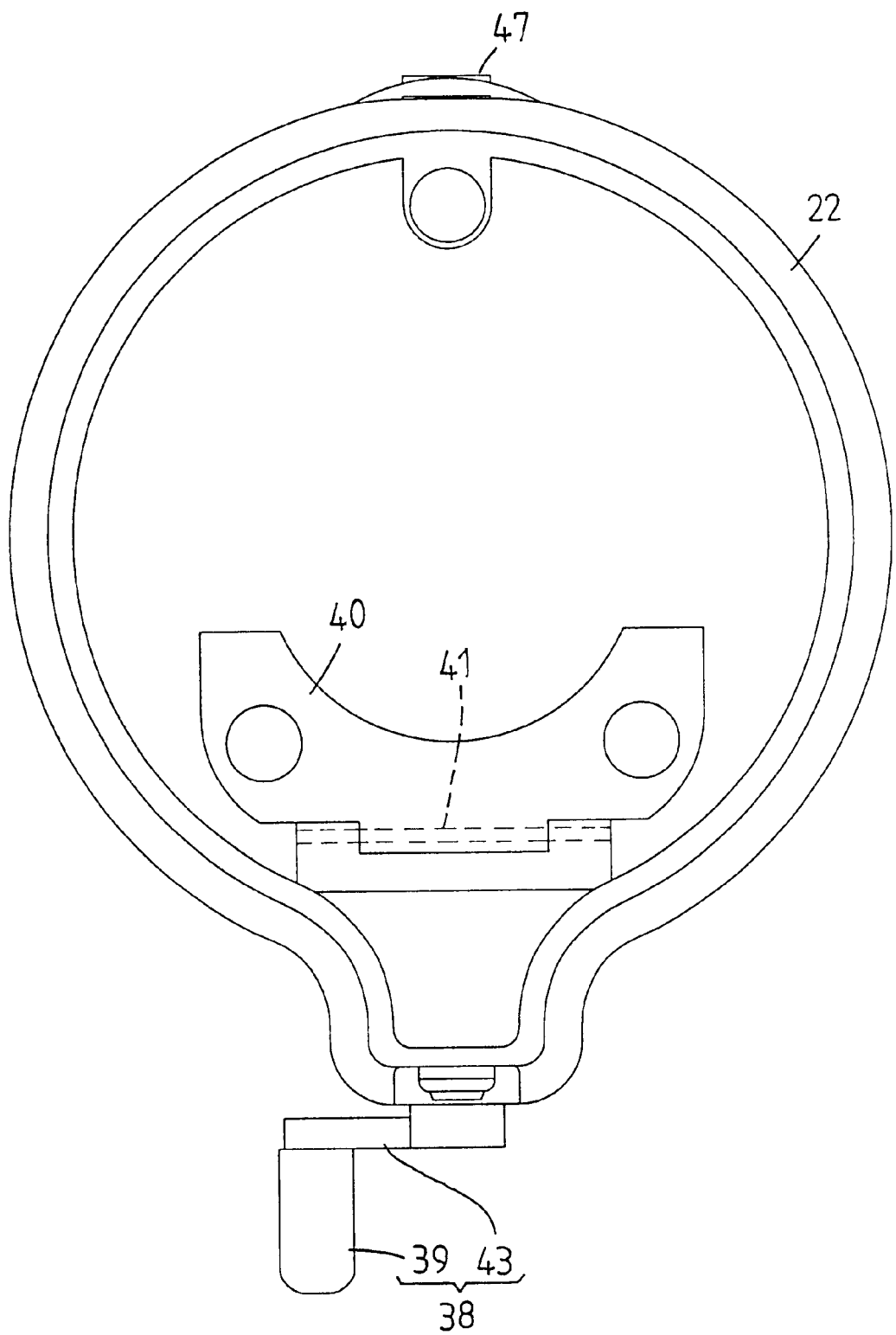
FIG. 5 is a bottom view of the present invention.
Figure 6:
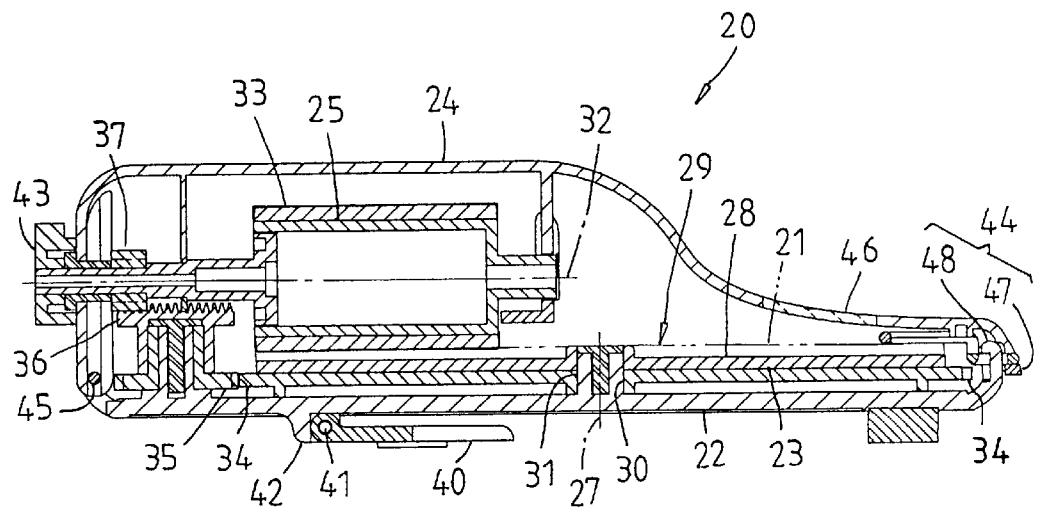
FIG. 6 is a sectional view taken along line 6—6 of FIG. 1.
Figure 7:
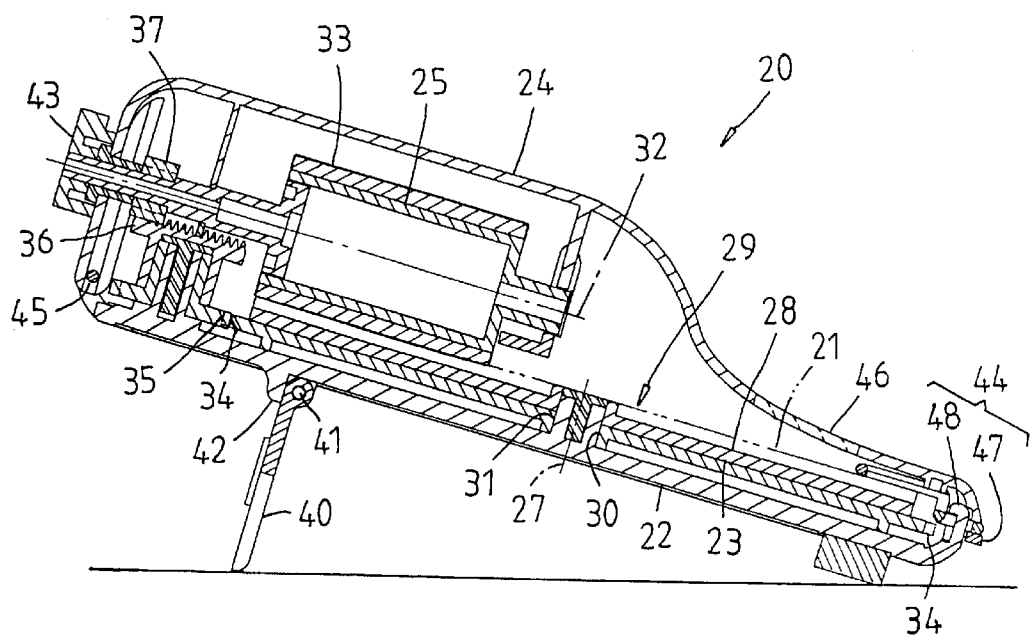
FIG. 7 is a view according to FIG. 6, in which the supporting rack is turned up, whereby an angle of 90 degrees is contained between the supporting rack and the bottom face of the base seat and one side of the base seat is lifted.

Please refer to FIGS. 1 to 7. The apparatus 20 for repairing the surface of the optical disc of the present invention is used to repair a damaged area of the laser transparent surface 21 of the optical disc (as shown in FIGS. 6 and 7). The apparatus includes a base seat 22, a rotary seat 23, an upper cover 24, a buffing roller 25 and a driving mechanism 26. The base seat 22 has a first central line 27 (as shown in FIGS. 6 and 7). The rotary seat 23 has a disc rest face 28 for a disc 29 to rest thereon. The rotary seat 23 has a central hole 30 in which a central shaft 31 of the base seat 22 is fitted to rotatably dispose the rotary seat 23 on the base seat 22. The first central line 27 of the base seat 22 is normal to the disc rest face 28 of the rotary seat 23. The rotary seat 23 is supported by the base seat 22 to rotate about the first central line 27 thereof. One side of the upper cover 24 is pivotally connected with the rim of the base seat 22 by a pivot pin 45 as a first pivot side. The upper cover 24 can be mated with the base seat 22 to cover the same. The upper cover 24 is formed with a crescent window 46 to a user to observe the operation in the upper cover 24.

The buffing roller 25 has a second central line 32 (as shown in FIGS. 6 and 7) and a buffing layer 33 around the surface of the buffing roller 25. The buffing layer 33 is centered at the second central line 32. The buffing roller 25 is rotatably disposed on inner side of the upper cover 24 with the second central line 32 passing over the disc rest face 28 of the rotary seat. When the upper cover 24 is closed to cover the base seat 22, the buffing layer 33 of the buffing roller 25 contacts with and passes over the laser transparent layer 21 of the disc 29.

The driving mechanism 26 is mounted between the rotary seat 23 and the buffing roller 25 for simultaneously rotating the rotary seat 23 and the buffing roller 25. When rotating, the buffing roller 25 buffs the surface of the laser transparent layer 21 of the disc 29. At the same time, the rotary seat 23 is driven to rotate, whereby the disc rested on the disc rest face 28 thereof is rotated about the first central line 27 of the base seat 22. In this embodiment, the buffing roller 25 is cylindrical. However, alternatively, the buffing roller 25 can be a truncated cone. (The small diameter end of the buffing roller 25 is proximate to the center of the disc 29, while the large diameter end thereof is proximate to the outer rim of the disc 29.) The shape of the buffing roller 25 is not limited.

The driving mechanism 26 in this embodiment includes a first gear 34, a second gear 35, a third gear 36 and a fourth gear 37. The first gear 34 is formed around the rim of the rotary seat 23. The second gear 35 is rotatably disposed on the base seat 22 and engaged with the first gear 34. The third gear 36 is fixedly connected with the second gear 35 and synchronously rotatable along with the second gear 35. The fourth gear 37 is fixedly coupled with the buffing roller 25 and separably engaged with the third gear 36. The driving mechanism 26 is not limited to the pattern shown in the figures. Other measures capable of making the linear speed of the buffing layer 33 of the buffing roller 25 different from the linear speed of the laser transparent layer 21 of the disc 29 can be also used. The number and coupling type of the gears are not limited.

The repairing apparatus 20 further includes an operation mechanism 38 for driving the rotary seat 23 and the buffing roller 25 to simultaneously rotate. In this embodiment, the operation mechanism 38 includes a crank 43 and a handle 39 rotatably disposed at a rear end of the crank 43. The operation mechanism 38 is directly fixedly connected with the buffing roller 25 and rotatable along therewith. By means of rotating the handle 39, the buffing roller 25 can be driven to rotate. Through the fourth gear 37 fixed on the buffing roller 25, the third gear 36, second gear 35 and first gear 34 are sequentially driven to make the rotary seat 23 rotate at the same time. The linear speed of the buffing layer 33 of the buffing roller 25, which contacts with the laser transparent layer 21, is different from the linear speed of the laser transparent layer 21 of the disc 29. Accordingly, the buffing layer 33 is able to buff the laser transparent layer 21 of the disc 29.

The repairing apparatus 20 of the present invention further includes a supporting rack 40 and a stop section 42. The supporting rack 40 has a flat board pattern. One side of the supporting rack 40 is pivotally connected with the bottom face of the base seat 22 by a pivot pin 41 as a second pivot side. The supporting rack 40 is pivotally rotatable relative to the base seat 22 to a folding position where the supporting rack 40 attaches to the bottom face of the base seat 22. Alternatively, the supporting rack 40 can be pivotally rotatable relative to the base seat 22 to a supporting position where the supporting rack 40 supports the base seat 22 and an angle is contained between the supporting rack 40 and the bottom face of the base seat 22. The stop section 42 is formed on the bottom face of the base seat 22 and adjacent to the second pivot side. When the supporting rack 40 is pivotally rotated to the supporting position, the supporting rack 40 is stopped by the stop section 42, whereby one side of the base seat 22 is lifted to facilitate cranking of the crank 43.

The repairing apparatus 20 of the present invention further includes a locking latch 44 including a latch plate 47 and a latch hook 48. The latch plate 47 is disposed on one side of the upper cover opposite to the first pivot side. The latch hook 48 is disposed on the base seat 22 at a position corresponding to the latch plate 47. The latch plate 47 can be latched with the latch hook 48 to lock the upper cover 24 with the base seat 22.

In use, the locking latch 44 is depressed to open the upper cover 24. Then the optical disc 29 is placed onto the disc rest face 28 of the rotary seat 23 with the laser transparent layer 21 facing upward. Then the upper cover 24 is closed to make the buffing layer 33 of the buffing roller 25 transversely lie on the annular laser transparent layer 21 of the disc 29 and make the fourth gear 37 engaged with the third gear 36. Then the supporting rack 40 is turned up from the base seat 22 to the supporting position, whereby an angle of about 90 degrees is contained between the supporting rack 40 and the bottom face of the base seat 22. At this time, one side of the base seat 22 is lifted and the handle 39 of the crank 43 can be rotated to drive the buffing roller 25 to rotate. Through the fourth gear 37 fixed on the buffing roller 25, the third gear 36, second gear 35 and first gear 34 are sequentially driven to make the rotary seat 23 rotate at the same time. The linear speed of the buffing layer 33 of the buffing roller 25, which contacts with the laser transparent layer 21, is different from the linear speed of the laser transparent layer 21 of the disc 29. Accordingly, the buffing layer 33 is able to buff the laser transparent layer 21 of the disc 29.

According to the above arrangement, the present invention has the following advantages:

1. The apparatus for repairing the surface of a optical disc according to the present invention is able to exert more uniform buffing force onto the readable surface of the optical disc to achieve evener buffing effect without damaging the readable surface.
2. The repairing apparatus of the present invention has smaller volume and can be easily carried or stored.

The above embodiments are only used to illustrate the present invention, not intended to limit the scope thereof. Many modifications of the above embodiments can be made without departing from the spirit of the present invention.

What is claimed is:

1. An apparatus for repairing a surface of an optical disc, which is used to repair a damaged area of a laser transparent layer of the optical disc, the apparatus comprising:

(a) a base seat;
    (b) a rotary seat having a disc rest face for an optical disc to rest thereon, the rotary seat being rotatably disposed in the base seat and having a first rotative axis normal to the disc rest face of the rotary seat, the rotary seat being supported by the base seat to rotate about the first rotative axis;
    (c) an upper cover having one side pivotally connected to a rim of the base seat as a first pivot side, the upper cover being closeable and mated with the base seat to form a cover therefore;
    (d) a longitudinally extended buffing roller having a longitudinally extended second rotative axis and a buffing layer disposed on a surface of the buffing roller, the buffing layer being concentrically disposed about the second rotative axis, the buffing roller being rotatably disposed on an inner side of the upper cover with the second rotative axis passing over the disc rest face of the rotary seat and intersecting the first rotative axis when the upper cover is closed, whereby when the upper cover is closed to cover the base seat, the buffing layer of the buffing roller contacts with and passes over an annular laser transparent layer of a disc; and
    (e) a driving mechanism mounted between the rotary seat and the buffing roller for simultaneously rotating the rotary seat and the buffing roller, whereby when rotating, the buffing roller buffs the surface of the laser transparent layer of the disc and at the same time, the rotary seat is driven to rotate, thereby rotating the disc disposed on the disc rest face of the rotary seat about the first rotative axis, the driving mechanism including:
        (i) a first gear formed around a rim of the rotary seat;
        (ii) a second gear rotatably disposed on the base seat and engaged with the first gear;
        (iii) a third gear fixedly coupled to the second gear and synchronously rotatable therewith;
        (iv) a fourth gear fixedly coupled to the buffing roller and separably engageable with the third gear; and
        (v) an operation mechanism formed by a crank directly and fixedly connected to the buffing roller for driving the buffing roller and the rotary seat to simultaneously rotate.

2. The apparatus for repairing the surface of a optical disc as claimed in claim 1, further comprising:

(a) a supporting rack having a board pattern, one side of the supporting rack being pivotally connected with a bottom face of the base seat as a second pivot side, the supporting rack being pivotally rotatable relative to the base seat to a folding position where the supporting rack attaches to the bottom face of the base seat, the supporting rack being also pivotally rotatable relative to the base seat to a supporting position where the supporting rack supports the base seat at an angle contained between the supporting rack and the bottom face of the base seat; and
    (b) a stop section formed on the bottom face of the base seat adjacent to the second pivot side, whereby when the supporting rack is pivotally rotated to the supporting position, the supporting rack is stopped by the stop section and one side of the base seat is lifted to facilitate cranking of the crank.

3. The apparatus for repairing the surface of a optical disc as claimed in any of claims 1 or 2, further comprising a locking latch including a latch plate and a latch hook, the latch plate being disposed on one side of the upper cover opposite to the first pivot side, the latch hook being disposed on the base seat at a position corresponding to the latch plate, whereby the latch plate engages the latch hook to releasably lock the upper cover with the base seat.

* * * * *